United States Patent [19]

Rirsch et al.

[11] Patent Number: 5,108,679
[45] Date of Patent: Apr. 28, 1992

[54] PROCESS FOR THE PRODUCTION OF CONCRETE BUILDING PRODUCTS

[75] Inventors: Eric Rirsch, West Sussex; Jeremy Wingfield, Wiltshire, both of United Kingdom

[73] Assignee: Redland Roof Tile Limited, Reigate Surrey, United Kingdom

[21] Appl. No.: 607,114

[22] Filed: Nov. 2, 1990

Related U.S. Application Data

[63] Continuation-in-part of Ser. No. 362,810, Jun. 7, 1989.

[30] Foreign Application Priority Data

Jun. 11, 1988 [GB] United Kingdom ............... 8813894

[51] Int. Cl.⁵ .................... B28B 11/14; B29C 47/00
[52] U.S. Cl. .................... 264/118; 106/675; 106/679; 106/681; 106/698; 106/705; 106/711; 106/716; 106/718; 106/782; 106/801; 106/802; 106/805; 106/811; 264/122; 264/148; 264/157; 264/163; 264/177.11; 264/177.2; 264/211; 264/211.11; 264/333; 264/DIG. 31; 264/DIG. 49
[58] Field of Search ........... 264/148, 211.11, 177.11, 264/177.18, 177.2, 108, 333, 211, 157, 163, 118, 122, DIG. 31, DIG. 49, 297.1; 106/711, 802, 805, 675, 676, 679, 698, 705, 716, 782, 801, 681, 718, 811

[56] References Cited

U.S. PATENT DOCUMENTS 2,569,323 9/1951 Maynard ................... 264/148 X
4,305,901 12/1981 Prince et al. .
4,655,981 4/1987 Nielsen et al. ............. 264/148 X
4,673,543 6/1987 Akasaka et al. .
4,695,418 9/1987 Baker et al. .

FOREIGN PATENT DOCUMENTS 59417 5/1975 Japan .
5019581 2/1980 Japan .
5124605 9/1980 Japan .
00135 1/1985 PCT Int'l Appl. .
2101984 1/1983 United Kingdom .
2161415 1/1986 United Kingdom .
2195626 4/1988 United Kingdom .
2198072 6/1988 United Kingdom .

Primary Examiner—Karen Aftergut
Attorney, Agent, or Firm—Beveridge, DeGrandi & Weilacher

[57] ABSTRACT

A process for the production of concrete roofing products of reduced weight loading having a thickness in section of not greater than 15 mm. The process involves forming an asbestos-free cementitious composition comprising (i) lightweight aggregate, (ii) hydraulic cement, (iii) water and (iv) reinforcing fibers in an amount of not more than 4% by weight of the total weight of the composition but the fibers being present in an amount sufficient to provide a reinforcing effect and impact strength in the roofing product, the cementitious composition being capable of being shaped by a roller and slipper method, and thereafter shaping the cementitious composition by the method to provide a shaped extrudate, dividing the extrudate to form sections and curing the sections to provide roofing products, wherein the reinforcing fibers have lengths of 0.5 mm to 20 mm. The impact resistant roofing products are useful as roofing tiles, or a replacement for shingles, shakes and slates.

27 Claims, 1 Drawing Sheet

PROCESS FOR THE PRODUCTION OF CONCRETE BUILDING PRODUCTS

This application is a continuation-in-part of U.S. application Ser. No. 362810 filed 7th Jun. 1989.

This invention relates to the production of fibre-reinforced concrete building products by conventional extrusion processes and is particularly concerned with such a process which provides lightweight impact resistant roofing products of a kind which are, for example useful as interlocking roof tiles or as a replacement for shingles, shakes, asbestos cement slates and natural slates.

Such a conventional extrusion process is the roller and slipper method of producing concrete roof tiles. The process is well known and comprises the steps of compressing a mix of cement, aggregate and water on to moving pallets first by means of a roller and then by means of a slipper. The ribbon of tile-forming material thereby obtained is cut into sections of the required length and cured by conventional means. A description of the conventional means which is widely used to make tiles International Publication No. WO 85/00135.

Cement mortars and cement concretes are widely used as cheap building materials. Such cement bonded materials, while being acceptably durable, have the disadvantage of low tensile strength, low flexural strength and low impact strength. For many applications these disadvantages do not present a problem but where it is desirable to reduce product thicknesses or where very thin cross-section products are required, it is desirable to have products of high impact strength and good durability. By good durability is meant good resistance to:

(a) variations in climatic conditions, particularly freeze-thaw conditions and cycles of alternative rain and sunshine;
(b) ultra-violet attack;
(c) acid rain; and,
(d) abrasion of surfaces by the elements such that the strength of a product is maintained throughout its life.

Products of reduced thickness are required, for instance, where it is necessary to reduce weight-loadings on old previously slated roofs, where the use of concrete roof tiles of conventional thickness is prohibited by increased weight on roof timbers, where it is desirable to reduce material costs by reducing the quantities required or from an aesthetic consideration where thicker products may be less desirable.

These products are intended where it is necessary to replace asbestos cement roof products with a material which does not present a health hazard or to provide durable alternatives to wooden shakes or shingles.

There is thus a need for concrete building products produced by conventional extrusion processes to give impact resistant products of reduced thickness or to give very thin cross-section products of high flexural strength and high impact strength to make possible the use of a relatively cheap material without the health hazards associated with alternative materials for a wide range of applications. For a given material, as thickness is reduced so resistance to impact damage is decreased. This can be compensated for by increasing impact strength per unit thickness.

In the field of cementitious compositions it is known to use a variety of polymeric compounds as additives to modify the properties of the cured or uncured product.

In U.S. Pat. No. 3,850,651 the improvement in the mechanical properties and resistance to chemicals obtained by the incorporation in a concrete composition of vinyl polymers or copolymers is disclosed.

In U.K. 2,195,626 A the improvements in flexural strength and durability obtained by the modification of a cementitious composition by a polymer latex is described. By the term "polymer latex" in this and the present specification there is meant small particles of water-insoluble polymeric material which are suspended in aqueous medium. In particular, flexural strengths of at least 25 MPa can be obtained by a 10% polymer addition (solid polymer expressed as a percentage of the weight of the cement) along with marked improvements in durability. The improvements in durability are thought to be achieved by the use of a water-insoluble polymeric material and the combination of low water:cement ratios and good compaction techniques giving the cured material low porosity and in particular very low volumes of pores larger than 100 microns.

In U.K. 2,101,984 B the effect of reducing the water:cement ratio in polymer modified concretes is disclosed as well as using special means to provide good compaction of the cementitious composition. Flexural strengths of 20 to 25 MPa may be obtained when the materials are dry but when saturated or partially saturated with water these materials are reduced in strength.

Many types of polymer latex can be used to bring about the increased strength and durability as disclosed in U.K. 2,195,626 A. Examples of suitable latices include: elastomeric polymers such as natural and synthetic rubber, thermoplastics such as polyacrylic esters, ethylene-vinyl acetate copolymers, polyvinylidene chloride and polyvinyl acetate, thermosetting resins such as epoxy resins.

In general, the impact strength of a product is indicative of its resistance to a suddenly applied load. For roofing products the impact strength can give an indication of how resistant a particular product will be to breakage by nailing, cutting or transit. Many prior art tiles are subject however to brittleness as evidenced in known "nailing" and "walk on" tests.

It is known that the impact strength of a cementitious product may be improved and the brittleness reduced by including a fibre in the composition. Such fibre-reinforced products are also sometimes acceptably durable, the best known example being asbestos cement.

It must be understood that where the term "reinforcing fibres" is used as a constituent of the composition in some cases the actual strength of the composition may not be reinforced or increased, but instead the fibres have a reinforcing effect by providing cross links within the composition to prevent break up.

Fibrous materials which have been used in the past to increase strengths of cementitious products include fibres of asbestos, glass, steel, ceramic, polymer and natural materials. The use of fibres does, however, have certain drawbacks in some cases since in the long term the presence of the fibres may adversely affect the strength of the product because the fibres may suffer degradation due to alkali attack, which, coupled with long-term weathering, may also adversely affect the durability of the finished product. Moreover, depending on the manufacturing route chosen the use of such fibrous materials can add to the difficulty of processing the composition. In general, as the amount or length of fibres increase, the processability of the material is reduced. Furthermore, some fibres, for example asbestos, may involve health hazards due to carcinogenity and/or toxicity of the fibrous material.

The roller and slipper method is one of the conventional routes used in processing cementitious mortars for the production of roof tiles Incorporation of fibres into these mortars has been explored in the past and found to be unsuccessful resulting in inconsistent feeding and incomplete tiles.

Due to this difficulty, other more elaborate methods have been investigated previously such as that described in UK 2,108,897B where vibrating casting has been found to be necessary to produce fibre reinforced cementitious material. Furthermore, there are no fibre-reinforced products currently produced by the roller and slipper method.

A first embodiment of the present invention has the aim of providing reduced weight loading, impact resistant products having low susceptibility to water and good durability from hydraulic cement concretes and mortars modified by the addition of fibre reinforcement, said products being produced by the roller and slipper method.

A second embodiment of the present invention has the aim of providing very thin products having high flexural strength, high impact strength, low susceptibility to water and good durability from hydraulic cement concretes and mortars modified by the addition of a polymer latex and fibre reinforcement, said products being produced by the roller and slipper method.

Figure 1:
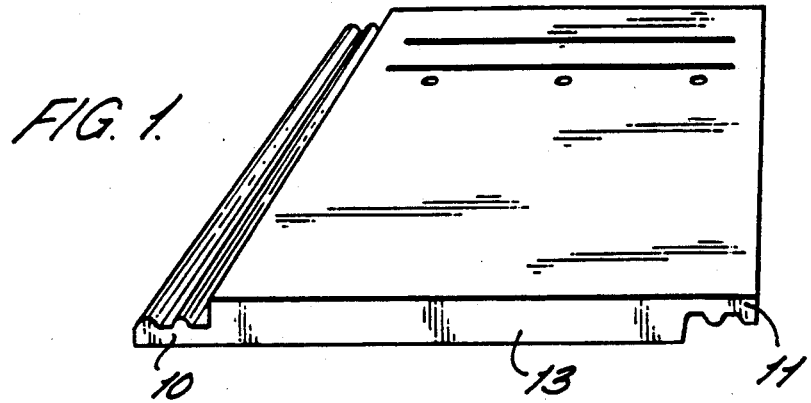
FIGS. 1 and 2 show two different types of tile having side locks.

Accordingly, a first aspect of the present invention provides a process for the production of concrete roofing products of reduced weight loading having a thickness in section of not greater than 15 mm which process comprises forming an asbestos-free cementitious composition comprising (i) lightweight aggregate, (ii) hydraulic cement, (iii) water and (iv) reinforcing fibres in an amount of not more than 4% by weight of the total weight of the composition but said fibres being present in an amount sufficient to provide a reinforcing effect and impact strength in the said roofing product, said cementitious composition being capable of being shaped by a roller and slipper method, and thereafter shaping said cementitious composition by said method to provide a shaped extrudate, dividing said extrudate to form sections and curing said sections to provide said roofing products, wherein said reinforcing fibres have lengths of 0.5 mm to 20 mm.

By controlling fibre within a given range of dimensions it is advantageously possible to formulate materials processible by the conventional technique of roller and slipper extrusion. Processibility, can, although not essentially be, further assisted by the incorporation of, for example, superplasticisers or polymer latices which increase the processibility of formulations by reducing the shear force necessary for the material to flow. Furthermore, up to a point it is believed that by using higher fractions of cement in the formulation, it is possible to increase the volume of fibres in the mix and still retain processibility.

Another advantage of the process of the present invention lies in the production of flat roofing slates to be used as a replacement for natural slates. These slates are typically 600 mm long and 300 mm wide and can be produced using the roller and slipper extrusion process by extruding 300 mm wide and cutting to 600 mm length. A benefit of the roller and slipper process is that the fibres and slate particles are aligned parallel to the extrusion direction thereby introducing an anisotropy in properties. This gives particular benefits in preventing cracking during fixing and enables relatively large distances to be spanned such as those between roof battens.

A second aspect of the present invention provides a process for the production of concrete roofing products of reduced weight loading having a thickness in section of not greater than 15 mm which process comprises forming an asbestos-free cementitious composition comprising (i) lightweight aggregate, (ii) hydraulic cement, (iii) water and (iv) reinforcing fibres in weight per cent to the total weight of the composition of 0.15% to 4%, said cementitious composition being capable of being shaped by a roller and slipper method, and thereafter shaping said cementitious composition by said method to provide a shaped extrudate, dividing said extrudate to form sections and curing to provide said roofing product, wherein said reinforcing fibres have lengths of 2.0 mm to 20 mm.

A third aspect of the present invention provides a process for the production of concrete roofing products of reduced weight loading having a thickness in section of not greater than 15 mm which process comprises forming an asbestos-free cementitious composition comprising (i) lightweight aggregate, (ii) hydraulic cement, (iii) water, (iv) reinforcing fibres in an amount of not more than 4% by weight of the total weight of the composition but said fibres being present in an amount sufficient to provide a reinforcing effect and impact strength in the said roofing product, and (v) a polymer latex in weight ratio of polymer, calculated as dry weight, to cementitious material within the range of 5:100 to 50:100, said cementitious composition being capable of being shaped by a roller and slipper method, and thereafter shaping said cementitious composition by said method to provide a shaped extrudate, dividing said extrudate to form sections and curing to provide said roofing product, wherein said reinforcing fibres have lengths of 0.5 mm to 20 mm.

A fourth aspect of the present invention provides a process for the production of concrete roofing products of reduced weight loading having a thickness in section of not greater than 15 mm which process comprises forming an asbestos free cementitious composition comprising (i) lightweight aggregate, (ii) hydraulic cement, (iii) water, (iv) reinforcing fibres in weight percent to the total weight of the composition of 0.15% to 4%, and (v) a polymer latex in weight ratio of polymer, calculated as dry weight, to cementitious material within the range of 5:100 to 50:100, said cementitious composition being capable of being shaped by a roller and slipper method, and thereafter shaping said cementitious composition by said method to provide a shaped extrudate, dividing said extrudate to form sections and curing to provide said roofing product, wherein said reinforcing fibres have lengths of 2.0 mm to 20 mm.

Preferably the composition additionally comprises a plasticiser or a superplasticiser.

Preferably, the composition comprises reinforcing fibres of 0.15 to 1 percentage by weight of fibres based on the total weight of the composition and preferably, the fibres have lengths of 4 mm to 8 mm.

More preferably, the composition comprises 0.5 percentage by weight of reinforcing fibres based on the total weight of the composition, and lengths of substantially 6 mm.

The fibres are preferably polypropylene fibres and the composition preferably comprises from 1 to 30% silica fume calculated as a percentage of the weight of cementitious material in the composition.

Preferably the aggregate is a mixture of lightweight and non-lightweight aggregates. In a preferred embodiment of the invention the weight ratio of aggregate:cementitious material in said composition is from 1:1 to 4:1. The weight ratio of lightweight aggregate:cementitious material is preferably 2:1.

Preferably the weight ratio of water:cementitious material in the composition is from 0.15:1 to 0.90:1 and more preferably from 0.5:1 to 0.7:1.

Preferably, where polymer is present, the weight ratio of polymer, calculated as dry weight, to cementitious material is from 2:100 to 15:100 and more preferably from 3:100 to 5:100.

The composition may be cured using an autoclave.

The advantages of autoclaving include the possibility of reduction in curing time and also improvements in strength. For example, it has been shown in "The Effects of Activated Silica on the Mechanical Properties of Concrete Submitted to High Temperature Curing", by S. Nagataki, Cement and Concrete (Japan) NO387, May 1979, that autoclaving a Portland cement—silica fume—superplasticiser material gives improvements in strength over normal heat curing.

Compositions for use in the production of fibre-reinforced concretes and mortars include the following ingredients:

(i) Aggregate

Various types of aggregate may be used. A major proportion of the aggregates used in "lightweight" roofing products, i.e. products which are of reduced weight and therefore provide reduced load on the roof structure, are lightweight aggregates. Such products may comprise 100% lightweight aggregate or a mix of lightweight and non-lightweight aggregates. The non-lightweight aggregate may comprise 30% of the total aggregate by weight but for a roofing product with maximum reduced weight loading no non-lightweight aggregate may be used. The preferred compositions utilising lightweight aggregate have an aggregate:cementitious ratio of 2:1.

(a) Lightweight Aggregates

The lightweight aggregates are low density aggregates, such as vermiculite, perlite, hollow glass spheres, natural lightweight aggregate (such as pumice), expanded clays and shales (such as RIDGELITE and UTELITE), sintered pulverised fuel ash and various blends thereof. Expanded shales are favoured because of their lightweight compared with other lightweight aggregates.

RIDGELITE is supplied by Pacific Lightweight Products of California and is a coated expanded clay lightweight aggregate. The clay is pulverised, mixed with a controlled amount of moisture, extruded under high pressure before being baked in high temperature kilns. At a temperature of around 2000° F. the pieces of clay become vitreous and a hard ceramic glaze forms on the outside surface surrounding the expanded interior. This expanded interior is composed of tiny microscopic non-interconnected voids or air spaces which give the material its intrinsic lightweight. The hardened vitreous material produces the inherent structural strength of the aggregate particles. The size of the aggregate is controlled by the kiln to which obtains the most efficient degree of internal expansion. The materials range in size from fines to large three-quarters of an inch maximum pieces. Special equipment is used to blend materials of certain sizes to the exact requirements of the customers.

UTELITE is supplied by the UTELITE Corporation of Utah and is an expanded shale comprising shale, quartz (crystalline silica) and amorphous silicon in excess of 1%. The UTELITE aggregates are supplied in coarse, mediums, fines, crushed fines and fine fines or in various blends thereof. In essence the production process is similar to RIDGELITE, the only significance difference being in the chemistry of the feed stock material.

Natural pumice is supplied by Glass Mountain Pumice Inc. of California. Naturally occurring Californian pumice is simply crushed and screened to produce sized aggregate. The density of the resulting product is between 1200 and 1400 pounds per cubic yard.

A preferred size of the particles of the lightweight aggregate is from 0.5 to 1.50 mm.

The following table compares the percentage content of size of particles of various lightweight aggregates:

| Size (Microns) | RIDGELITE # 3 | UTELITE Crushed Fines | UTELITE Fine Fines | Crater Rock Pumice | Lytag |
|---|---|---|---|---|---|
| | | Percentage by Weight | | | |
| 4750 | 0 | 11 | 0 | 27 | 19 |
| 2360 | 26 | 41 | 18 | 40 | 17 |
| 1180 | 27 | 25 | 29 | 17 | 26 |
| 600 | 19 | 11 | 17 | 4 | 20 |
| 300 | 12 | 5 | 10 | 3 | 5 |
| 150 | 9 | 4 | 9 | 1 | 13 |
| 75 | 7 | 3 | 17 | 8 | 0 |

The gradings of blended materials, rather than the manufactured products are as follows:

| Size (Microns) | 20% CF: 80% FF | 25% CF: 75% FF | 30% CF 70% FF | 40% CF 60% FF | 50% CF 50% CRP |
|---|---|---|---|---|---|
| | | Percentage by Weight | | | |
| 4750 | 2.2 | 2.7 | 2.2 | 4.4 | 19 |
| 2360 | 22.6 | 23.8 | 20.8 | 27.2 | 40.5 |
| 1180 | 28.2 | 28.0 | 25.3 | 27.4 | 21 |
| 600 | 15.8 | 15.5 | 14.1 | 14.6 | 7.5 |
| 300 | 9 | 8.7 | 8 | 8 | 4 |
| 150 | 8 | 7.8 | 7.1 | 7 | 4.5 |
| 75 | 14.2 | 13.5 | 12.5 (10% 4750 Microns) | 11.4 | 5.5 |

CF = UTELITE Crushed Fines
FF = UTELITE Fine Fines
CRP = Crater Rock Pumice (b) Non-Lightweight Aggregates The aggregates are conveniently provided by slate or sand or mixtures thereof. The preferred ratios of aggregate:cement by weight lie in the range 0.5:1 to 4:1. In general, preferred compositions have an aggregate:cement ratio of 1.5:1. For example they may comprise course slate and fine sand. Generally course slate or sand can be defined as comprising particles of which not more than 10% by weight have a size of less than 200 microns. Fine slate or sand generally has more than 90% by weight of its particles having a size of less than 300 microns. The course slate may be supplied by Delabole State Quarries, Cornwall, England, or Redland Aggregates, Blaenau Ffestiniog, Wales and a useful material for the products of this invention is type S12 containing the following fractions:

| | Size (microns) | % by weight |
|---|---|---|
| A | 2360 | 0.1 |
| B | 1180 | 9.0 |
| C | 600 | 61.1 |
| D | 300 | 26.3 |
| E | 150 | 1.3 |
| F | 75 | 0.3 |
| G | 53 | 0.6 |
| H | Less than 53 | 1.3 |

A suitable fine and is supplied by David Ball of Cambridge, England, and contains the following fractions:

| | Size | % by weight |
|---|---|---|
| I | 300 microns–150 microns | 50% |
| J | 150 microns–90 microns | 25% |
| K | Less than 90 microns | 25% |

Other fine sands are available, such as WROTHAM 75 supplied by Buckland Sand and Silica Co., Reigate, Surrey.

A preferred slate with fine said mixture contains 60% of type S12 course slate and fine sand mixture 20%J, 10%J and 10%K.

(ii) Cement

The cement used in the compositions are conveniently hydraulic cements, i.e. those which set and harden by the addition of water, that is in the presence of water. The cement may be a silicate cement such as PORTLAND CEMENT or RAPID HARDENING PORTLAND CEMENT or it may be an aluminate cement. The compositions may include mixtures of different hydraulic cements.

The cementitious composition may comprise blast furnace slag, pulverised fuel ash or silica fume. In particular, it is preferred to include from 1 to 30% of silica fume, calculated as a percentage on the weight of cementitious material in the composition, since it has the effect of reducing porosity and increasing the strength of the cured product. More preferably, the composition contains from 5 to 15% silica fume. In all calculations the weight of cement or cementitious material includes the weight of the silica fume.

The silica fume preferably contains the following fractions:

| | Size | % by weight |
|---|---|---|
| A | Less than 0.05 microns | 20 |
| B | Less than 0.10 microns | 70 |
| C | Less than 0.20 microns | 95 |
| D | Less than 0.50 microns | 99 |

(iii) Water

Advantageously the weight ratio of water to cement and/or cementitious material is just sufficient to provide adequate workability of the mix. A weight ratio of water:cementitious material of 0.15 to 0.40 is usually preferred when non-lightweight aggregates are used. When lightweight aggregates are used more water is necessary as the aggregates are more absorbent. In some areas a ratio of up to 0.9:1 is required, but it is more usually in the range 0.5:1 to 0.7:1. Where a polymer latex is added to the cementitious material comprising non-lightweight aggregates the weight ratio of water:cementitious material of 0.12:1 to 0.25:1 is preferred. The water includes that from any latex and plasticiser present and the binder includes both the cement (C) and silica fume (SiF) where it is added. A measurement of the total amount of water in a particular formulation is given as the W/(C+SiF) ratio. That is the ratio of the total water content to the total binder content.

(iv) Fibres

As referred to above, many types of fibre have been previously used to add reinforcement to cement and/or concrete compositions.

Various fibre types may be used in compositions according to the present invention including polypropylene fibres, polyvinylalcohol fibres, polyacrylonitrile fibres, jute, E-glass fibres and cellulose fibres. Various fibre types and their important properties are listed in Table 1 below.

TABLE 1

| | | FIBRE PROPERTIES | | | |
|---|---|---|---|---|---|
| | | Examples used in Formulations | | | |
| Type | Density (g/cm$^3$) | Name | Length (mm) | Diameter ($\mu$m) | Elastic Modulus (GPa) |
| Polypropylene (fibrillated) | 0.92 | Krenit Rein | 2.5–10 | 140–220 | 15 |
| | | Fibermesh | 6 | 300 | 15 |
| Polypropylene (monofilament) | 0.92 | PFE (crimped) | 10 | 50 | 5 |
| | | Crackstop | 6–12 | 20 | 5 |
| Polyvinylalcohol | 1.3 | Kuralon RM182 | 6 | 15 | 35 |
| | | Kuralon RMS182 | 6 | 20 | 30 |
| | | Mewlon | 6–12 | 20 | 20 |
| Polyacrylonitrile | 1.15 | Sekril 110 | 6 | 15 | 13 |
| | | Sekril 900 | 6 | 35 | 7 |
| | | Courtelle SP/15 (crimped) | 20 | 15 | 7 |
| | | Ricem | 6 | 15 | 5 |
| | | Dolanit | 6 | 55 | 16 |
| Polyester | 1.2 | Nurlon | 20 | 35 | 17 |
| E Glass | 2.5 | Chopped Strands | 5 | 15 | 75 |
| Jute | 1.2 | Taytec | 5 | 60 | 30 |

TABLE 1-continued

| | | FIBRE PROPERTIES | | | |
|---|---|---|---|---|---|
| | | Examples used in Formulations | | | |
| Type | Density (g/cm³) | Name | Length (mm) | Diameter (μm) | Elastic Modulus (GPa) |
| Cellulose | 1.2 | Kraft Board | 1 | 30 | 30 |
| | | Custom | 1 | 20 | 30 |
| Ceramic | 2.7 | Fiberfrax | 0.5–10 | 2 | 95 |

KRENIT and CRACKSTOP are supplied by FIBROMIX LIMITED of Clifton, Derbyshire, England.

CUSTOM is supplied by BOUD MARKETING LIMITED of Laddington, England.

FIBERMESH is supplied by FIBERMESH (EUROPE) LIMITED of Chesterfield, England.

NURLON is supplied by SMITH CHEMICAL CORPORATION of Ohio, United States of America.

FIBERFRAX is supplied by CARBORUNDUM RESISTANT MATERIALS LIMITED of St. Helens, England.

DOLANIT is supplied by HOECHST UK LIMITED of Hounslow, England.

KURALON is supplied by MITSUBISHI CORPORATION of London, England.

MEWLON is supplied by UNITIKA KASEI LIMITED of Osaka, Japan.

SEKRIL and COURTELLE are supplied by COURTAULDS FIBRES LIMITED of Coventry, England.

PFE is supplied by POLYMER FIBRE ENGINEERING of England.

RICEM is supplied by MONTEFIBRE UK LIMITED of Bradford, England.

TAYTEC is supplied by CROXTON & GARRY LIMITED of Dorking, England.

E-GLASS is supplied by FIBREGLASS LIMITED of St. Helens, England.

KRAFT is supplied by BUNZL PULP & PAPER LIMITED of London, England.

As previously mentioned, in the past it has not been possible to process fibre-reinforced compositions by conventional extrusion processes. Surprisingly, it has been discovered that it is possible to process certain of the fibres listed in Table 1. In particular, good processability of a cementitious composition is obtained with fibres of polypropylene, polyvinylalcohol, polyacrylonitrile, and E-Glass. More particularly, even better processability of a cementitious composition is obtained with polypropylene fibres of the type KRENIT which are supplied as 38,000 denier fibrillated fibres. Such fibrillated fibres, with fibre diameters of around 200 microns, can be more readily incorporated into the compositions than the much finer monofilament fibres because the water demand of the formulation is reduced. During fibrillation, which is a mechanical process, fibres are produced with interconnecting strands and a rough surface which form a good mechanical bond with the cement matrix unlike monofilament fibres. An advantage of fine monofilament fibres over the thicker fibrillated type is that a smoother product is obtained as the fibrillated fibres tend to protrude from the extruded material.

The amount of fibres incorporated into the different compositions are expressed in terms of the percentage by weight of the total. The amount of fibres can also be expressed as a percentage by volume of the total and this will depend on the density of the whole composition and the specific gravity of the fibre. In the examples given the KRENIT polypropylene fibres with a weight percent loading of 0.5% would be equivalent to a volume percent loading of 1.1% where the specific gravity of polypropylene is 0.92 g/cm³. A weight percent loading of 0.5% of SEKRIL 110 fibres, which have a specific gravity of 1.18 g/cm, would be equivalent to a volume percent loading of 0.9%.

Preferably the percentage by weight of fibres in the composition is less than 4% and more than 0.15%. Compositions containing more than 4% by weight of fibres were found to be difficult to process by the roller and slipper method.

Preferably the length of the fibres in the composition is less than 20 mm and more than 0.5 mm. Compositions containing fibres longer than 20 mm were found to have a somewhat "hairy" appearance influencing the aesthetic appeal of the cured product. Cutting problems were also experienced with compositions containing fibres longer than 20 mm.

The aspect ratio of fibres can be calculated by dividing the fibre length by diameter and the aspect ratio of the fibres is from 10 to 5,000, preferably 18 to 1000, more preferably 20 to 3000, and most preferably 10 to 600. The aspect ratios of the preferred fibers given in Table 1 are as follows:

| | |
|---|---|
| KRENIT Resin | 11.4–71.4 |
| FIBERMESH | 20 |
| PFE (crimped) | 200 |
| CRACKSTOP | 300–600 |
| KURALON RM182 | 400 |
| KURALON RM5182 | 300 |
| MEWLON | 300–600 |
| SEKRIL 110 | 400 |
| SEKRIL 900 | 171 |
| COURTELLE SP/15 (crimped) | 1333 |
| RICEM | 400 |
| DOLANIT | 109 |
| NURLON | 571 |
| Chopped Strands | 333 |
| TAYTEC | 83 |
| KRAFT Board | 33 |
| CUSTOM | 50 |
| FIBERFRAX | 250–5000 |

(v) Additives

Conveniently, to aid homogeneous dispersion of the various components of the composition and to give an easily processable mix a polymer latex as used in UK 2,195,626A and/or a plasticiser such as CORMIX P1 or a superplasticiser such as CORMIX SP2 both supplied by Cormix Ltd., of Cheshire, England, may be added to the composition. CORMIX P1 plasticiser is a liquid lignosulphonate plasticiser supplied at 25% aqueous solution. CORMIX SP2 superplasticiser is a melamine formaldehyde sulphonate at 28% solids formed by the condensation reaction and subsequent sulphonation of melamine and formaldehyde.

It is believed that both superplasticisers and polymer latices, primarily function by aiding dispersion of the components of the cementitious composition. By dispersing agglomerates of particles these additives reduce the viscosity of the formulation, which enables the quantity of added water to be reduced and the strength of the cured cement matrix to be correspondingly increased. When a polymer latex is present in the composition, a further increase in strength may be obtained by a contribution to the composite from the strength of the coalesced polymer particles. The coalesced polymer latex may also reduce water uptake of the cured product.

A further function of these additives in the case of the present invention, is to assist in processing the fibrous mortars by the roller and slipper technique by modifying viscometric properties.

When mixing superplasticised cement formulations it is advantageous to delay the addition of the plasticiser until all the water had been added. This time delay can advantageously be from several seconds to up to 10 minutes. When the addition of plasticiser is delayed it is found that less water is needed in order to achieve the same mix consistency than if the water and plasticiser were added together. This reduction in the overall water content can lead to higher flexural strengths, which are known to be related to water content.

Combinations of polymer latex and plasticiser or superplasticiser may offer economic or technical benefits over the use of each component alone. In this case the function is believed to be similar to that of the individual components with benefit primarily through improved dispersion of particles and reduced water content. In lightweight tiles these additives help improve impact energy and tile strength.

Conveniently, to reduce unnecessary or unwanted air entrainment into the composition during processing, an anti-foaming agent such as BEVALOID 691, BEVALOID 770 DD or BEVALOID 581B supplied by Bevaloid Limited, Beverly, Yorkshire, England may be added.

Roof tiles are generally designed to be laid in an overlapping formation to prevent the ingress of water, snow, dirt and so on. To create a secure and tight fit between adjacent tiles many tiles have side locks 10, 11 (see the two different types of tile in FIGS. 1 and 2). The upper sidelock 11 of one tile overlies the lower sidelock 10 of the adjacent tile. These sidelocks 10, 11 must be of a suitable thickness to prevent them from being too easily broken off. Many tiles also have recesses or are hollowed out on their undersides, for example to make the tile lighter in weight or to accommodate a part of a tile beneath it. Such tiles often therefore have a thicker headlap portion 13 at their front ends so that the tile looks to be of a substantial thickness when viewed in situ.

Figure 3:
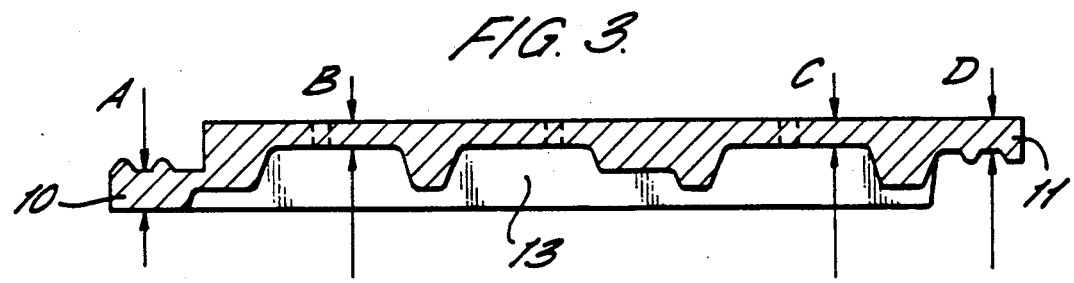
FIGS. 3 and 4 show cross sections of the tiles shown in FIGS. 1 and 2 respectively.
Figure 2:
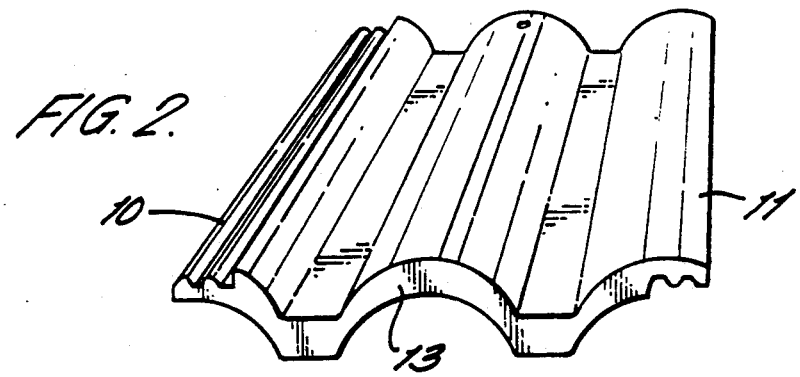
Figure 4:
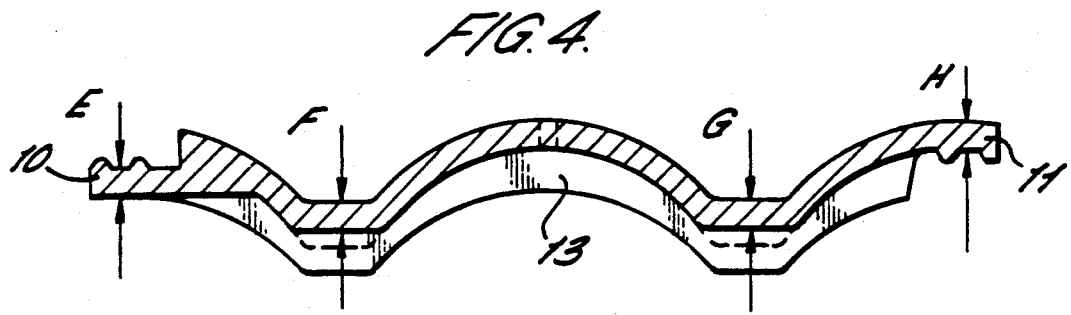

Whilst the sections of tiles forming such headlaps 13 and sidelocks 10, 11 are generally of a thickness greater than 15 mm, such sections only form up to 25% of the tile and therefore at least 75% of normal tiles would have a cross-sectional thickness not exceeding 15 mm. The varying cross sections of the two tiles shown in FIGS. 1 and 2 are shown in FIGS. 3 and 4 respectively.

Typical measurements on the Sections at the lettered arrows are as follows:

| A | 11.1 mm | E | 10.5 mm |
| B | 10.0 mm | F | 10.5 mm |
| C | 10.0 mm | G | 10.5 mm |
| D | 14.8 mm | H | 10.5 mm |

The composition may be used to make products having a thickness in section in the range 5 or 6 mm to 15 mm. As will be readily understood by a person skilled in the art a product specified by having a thickness of X mm may have portions of greater or lesser dimensions for the reasons stated above.

The following examples are comparative examples to compare the properties of compositions incorporating non-lightweight aggregates with later examples of compositions incorporating lightweight aggregates.

EXAMPLES 1 to 3

In these three examples, flexural strengths were measured by three-point bending using the formula:

$$S = \frac{3Wl}{bd^2}$$

where $S$ = flexural strength
$W$ = breaking load
$l$ = span between supports and centre loading point
$b$ = width
$d$ = thickness Impact strengths were measured transversely to the extrusion direction and in some cases parallel to the extrusion direction by a Zwick Charpy impact tester on samples 100 mm × 10 mm × 10 mm or as close to this as possible. A test span of 70 mm was used with a 0.5 J hammer.

The cementitious compositions were prepared by mixing the dry components in a Cretangle multiflow mixer for 2 minutes followed by addition of the liquid components (water, anti-foaming agent and superplasticiser). The compositions were mixed for a further 3 minutes. The fibres were then added and the compositions mixed for a further 3 minutes.

The compositions were then subjected to laboratory scale tile machine to give green products with thicknesses of between 8 mm and 10 mm.

The green products were than cured in a curing chamber at 50° C. and 100% relative humidity for 24 hours.

| Formulation |
| --- |
| 360 g Delabole S12 slate |
| 240 g David Ball Sand |
| 360 g Cement OPC |
| 40 g Silica fume (Microsilica) |
| 10.5 g Pigment |
| 16 g Superplasticiser (Cormix SP2) |

Where present the fibre reinforcement was provided by KRENIT polypropylene fibers. Example 1 used 112 g of water, Example 2 used 96 g of water and Example 3 used 88 g of water. The results are given in the following Table 2.

TABLE 2

| Example | A/C+ | W/C+ | Transverse Flexural Strength MPa | Transverse Impact Strength KJm$^{-2}$ | Fibre Weight % | Fibre Length mm |
|---|---|---|---|---|---|---|
| 1 | 1.5 | 0.31 | 13.2 ± 0.7 | 1.7 ± 0.4 | 0.5 | 5 |
| 2 | 1.5 | 0.27 | 15.1 ± 1.7 | 1.5 ± 0.2 | 0.5 | 5 |
| 3 | 1.5 | 0.25 | 16.5 ± 1.8 | 1.2 ± 0.1 | 0.0 | — |

A/C = Aggregate to cement ratio
W/C = Water to cement ratio

The flexural strength measurements were made after 7 days at ambient laboratory conditions post cure followed by a 1 day water immersion.

Compositions for use in the production of polymer modified fibre-reinforced concretes and mortars include the following ingredients as hereinbefore defined aggregates: cement, fibres, additives and water excepting that the weight ratio of water:cement is within the range of 0.5-0.9 and advantageously is just sufficient to provide adequate workability and the compositions additionally include the polymer which serves to provide the useful extra properties relative to similar compositions but which contain no polymer.

The polymer may be used in the form of a polymer latex as hereinbefore defined or may be a thermosetting resin such as an alkali soluble phenolic resol.

As referred to above, many types of polymer latex can be used to bring about the increased strength and durability in practising the present invention.

Preferred latices for use in the invention are vinyl chloride/vinyl acetate/ethylene terpolymers such as the Wacker Chemie product VINNOL CE35, and copolymers of alkyl methacrylate or acrylate and methacrylic or acrylic acid such as PRIMAL B-60A or PRIMAL E-357 supplied by Rohm and Haas Ltd. of Croydon, Surrey, England. Styrene acrylic copolymers such as LDM 6880 and ADH 3146 supplied by Harco of Harlow, Essex, England, may also be used.

The following are examples practising the invention using compositions incorporating lightweight aggregates.

EXAMPLES 4 to 6

Examples were made from a batch of mortar made up of two mixes. The mixing procedure started by adding the aggregate and pigment, mixing on low speed and adding a first part of water. The polymer or plasticiser was then added if used and mixed for 120 seconds. The cement was added followed by the fibres if used. The mixer agitator was then turned to middle speed and the remaining water added in stages to obtain a visually acceptable mix. The composition was then mixed for 60 seconds before discharging. The compositions were then subject to extrusion by the roller and slipper method on a laboratory scale time machine to give green products.

The green products were then cured and the tiles hand de-palleted immediately at the end of the cure and stacked under cover prior to twenty-four hour testing.

Examples 4 and 5 compare identical mixes with and without the addition of reinforcing fibres and, in both cases, without plasticiser. Example 6 demonstrates the further improvement derived from the addition of plasticiser. Where present the fibre reinforcement was provided by KRENIT polypropylene fibres. The lightweight aggregate used was a UTELITE 30:70 blend of Crushed:Fine Fines. The plasticiser, where present, was a 3% CORMIX Sp2 superplasticiser. The tiles tested were UK Double Roman Profiles having thicknesses of 11.8 mm, 11.3 mm and 11.4 mm respectively and all of 418×350mm width and length.

| Formulation | |
|---|---|
| 45 kg | Aggregate |
| 22.5 kg | Cement |
| 1.125 kg | Pigment (dry powder) |
| 0.675 kg | Plasticiser (where used) |
| 0.169 kg | Fibres (where used) |

TABLE 3

| Example | LA/C | W/C | Transverse Flexural Strength MPa | Falling Ball Impact Strength J | Fibre Weight % | Fibre Length mm |
|---|---|---|---|---|---|---|
| 4 | 2.0 | 0.54 | 6.4 | 1.1-1.2 | 0.0 | — |
| 5 | 2.0 | 0.60 | 8.3 | 2.0-2.4 | 0.25 | 6 |
| 6 | 2.0 | 0.57 | 9.3 | 2.4-2.9 | 0.25 | 6 |

LA/C = Lightweight Aggregate to Cement ratio
W/C = Water to Cement ratio

In the above cases the Impact Energy was measured using the falling ball method. In this method a tungsten carbide ball is dropped from a series of set heights on to a tile supported by bearers. The height at which cracking damage occurs is noted and the Impact Energy calculated by the product of the mass of the ball, acceleration due to gravity and the height of the ball at failure.

EXAMPLES 7 to 17

These examples compare the use of various aggregates in lightweight tile mix formulations. All the examples are fibre reinforced with 6 mm KRENIT polypropylene fibres at 0.25% fibre weight.

| Formulation | |
|---|---|
| 226.796 kg | Aggregate |
| 13.398 kg | Cement |
| 5.670 kg | Pigment (dry powder) |
| 3.402 kg | Plasticiser (where used) |
| 0.862 kg | Fibres (where used) |

In all, three different manufacturer's expanded shale products have been tested, one natural material (pumice) and one UK source sintered pulverised fuel ash. The difference between the materials is in their density.

TABLE 5

| Example | LA/C | W/C | Aggregate | Cross-breaking Strength N | Impact Strength J |
|---|---|---|---|---|---|
| 7 | 2.0 | 0.59 | U20:80 | 2011 | 2.4-2.6 |
| 8 | 2.0 | 0.53 | U25:75 | 1577 | 2.0-2.4 |
| 9 | 2.0 | 0.56 | U25:75 | 1993 | 2.4-2.6 |
| 10 | 2.0 | 0.58 | U25:75 | 1774 | 2.0-2.4 |
| 11 | 2.0 | 0.55 | U30:70 | 1797 | 2.1-2.3 |
| 12 | 2.0 | 0.55 | U30:70 | 1753 | 2.1-2.4 |
| 13 | 2.0 | 0.57 | U30:70 | 1850 | 2.1-2.5 |
| 14 | 2.0 | 0.60 | U30:70 | 2055 | 2.5-2.9 |
| 15 | 2.0 | 0.57 | U40:60 | 1797 | 1.9-2.1 |
| 16 | 2.0 | 0.62 | U50:P50 | 1726 | 2.6-3.0 |

TABLE 5-continued

| Example | LA/C | W/C | Aggregate | Cross-breaking Strength N | Impact Strength J |
|---|---|---|---|---|---|
| 17 | 2.0 | 0.64 | Ridge | 1770 | 2.3-2.5 |

LA/C = Lightweight aggregate to Cement ratio
W/C = Water to Cement ratio
U = UTELITE. ratio given is blend of Crushed:Fine Fines
P = Pumic (blended with UTELITE Fine Fines)
Ridge = RIDGELITE No. 3

We claim:

1. A process for production of concrete roofing products of reduced weight loading having high flexural strength and high impact strength and a thickness in section of not greater than 15 mm which process comprises forming an asbestos-free cementitious composition comprising (i) lightweight aggregate, (ii) hydraulic cement, (iii) water and (iv) reinforcing fibres in an amount of not more than 4% by weight of a total weight of said composition and said fibres being present in an amount sufficient to provide a reinforcing effect, high flexural strength and high impact strength in said roofing products, said formed cementitious composition being capable of being shaped by a roller and slipper method, and thereafter shaping said formed cementitious composition by said roller and slipper method to produce a shaped extrudate, dividing said extrudate to form sections and curing said sections to produce said roofing products of reduced weight loading having high flexural strength and high impact strength, wherein said reinforcing fibres have lengths of 0.5 mm to 20 mm.

2. A process as claimed in claim 1 wherein said composition additionally comprises a plasticiser or a superplasticiser.

3. A process as claimed in claim 1 in which an aspect ratio of said fibres is from 10 to 5000.

4. A process as claimed in claim 1 wherein said composition further comprises from 1 to 30% silica fume calculated as a percentage on a weight of hydraulic cement in said composition.

5. A process as claimed in claim 1 wherein particle size of said lightweight aggregate is from 0.5 to 1.50 mm.

6. A process as claimed in claim 1 wherein a weight ratio of water:hydraulic cement in said composition is from 0.15:1 to 0.90:1.

7. A process as claimed in claim 1 wherein a weight ratio of water:hydraulic cement in said composition is from 0.5:1 to 0.7:1.

8. A process as claimed in claim 1 wherein said composition is cured using an autoclave.

9. A process as claimed in claim 1 further comprising shaping said composition to provide roof tiles.

10. A process as claimed in claim 1 further comprising shaping said composition to form roof slates.

11. A process as claimed in claim 1 wherein said percentage by weight of reinforcing fibres to said total weight of said composition is from 0.15% to 1%.

12. A process as claimed in claim 11 wherein said percentage by weight of reinforcing fibres to said total weight of said composition is preferably in a range 0.15 to 0.35%.

13. A process as claimed in claim 1 wherein said reinforcing fibres are polypropylene fibers.

14. A process as claimed in claim 10 in which as aspect ratio of said fibres is from 10 to 600.

15. A process as claimed in claim 1 wherein said lightweight aggregate is a mixture of lightweight and non-lightweight aggregates.

16. A process as claimed in claim 15 in which up to 30% of said lightweight aggregate by weight is non-lightweight aggregate.

17. A process as claimed in claim 1 wherein a weight ratio of lightweight aggregate:hydraulic cement in said composition is from 1:1 to 4:1.

18. A process as claimed in claim 17 wherein said weight ratio of lightweight aggregate:hydraulic cement in said composition is substantially 2:1.

19. A process as claimed in claim 1 wherein said reinforcing fibres have lengths of from 4 mm to 8 mm.

20. A process as claimed in claim 19 in which an aspect ratio of said fibres is from 18 to 4000.

21. A process as claimed in claim 19 wherein said length of said reinforcing fibres is substantially 6 mm.

22. A process as claimed in claim 21 in which an aspect ratio of said fibres is from 20 to 3000.

23. A process for production of concrete roofing products of reduced weight loading having high flexural strength and high impact strength and a thickness in section of not greater than 15 mm which process comprises forming an asbestos-free cementitious composition comprising (i) lightweight aggregate, (ii) hydraulic cement, (iii) water, (iv) reinforcing fibres in an amount of not more than 4% by weight of a total weight of said composition and said fibres being present in an amount sufficient to provide a reinforcing effect, high flexural strength and high impact strength in said roofing products, and (v) a polymer latex in weight ratio of polymer, calculated as dry weight, to said hydraulic cement within a range of 5:100 to 50:100, said formed cementitious composition being capable of being shaped by a roller and slipper method, and thereafter shaping said formed cementitious composition by said roller and slipper method to produce a shaped extrudate, dividing said extrudate to form sections and curing said sections to product said roofing products of reduced weight loading having high flexural strength and high impact strength, wherein said reinforcing fibres have lengths of 0.5 mm to 20 mm.

24. A process as claimed in claim 23 wherein said weight ratio of polymer, calculated as dry weight, to hydraulic cement is from 2:100 to 15:100.

25. A process as claimed in claim 23 wherein said weight ratio of polymer, calculated as dry weight, to hydraulic cement is from 3:100 to 5:100.

26. A process for production of concrete roofing products of reduced weight loading having high flexural strength and high impact strength and a thickness in section of not greater than 15 mm which process comprises forming an asbestos-free cementitious composition comprising (i) lightweight aggregate, (ii) hydraulic cement, (iii) water and (iv) reinforcing fibres in weight percent to a total weight of said composition of 0.15% to 4%, said formed cementitious composition being capable of being shaped by a roller and slipper method, and thereafter shaping said formed cementitious composition by said roller and slipper method to produce a shaped extrudate, dividing said extrudate to form sections and curing said sections to produce said roofing products of reduced weight loading having high flexural strength and high impact strength, wherein said reinforcing fibres have lengths of 2.0 mm to 20 mm.

27. A process for production of concrete roofing products of reduced weight loading having high flexural strength and high impact strength and a thickness in section of not greater than 15 mm which process comprises forming an asbestos-free cementitious composition comprising (i) lightweight aggregate, (ii) hydraulic cement, (iii) water, (iv) reinforcing fibers in weight percent to a total weight of said composition of 0.15% to 4%, and (v) a polymer latex in weight ratio of polymer, calculated as dry weight, to said hydraulic cement within a range of 5:100 to 50:100, said formed cementitious composition being capable of being shaped by a roller and slipper method, and thereafter shaping said formed cementitious composition by said roller and slipper method to produce a shaped extrudate, dividing said extrudate to form sections and curing said sections to produce said roofing products of reduced weight loading having high flexural strength and high impact strength, wherein said reinforcing fibres have lengths of 2.0 mm to 20 mm.

* * * * *